United States Patent
Kondou et al.

(10) Patent No.: US 8,423,250 B2
(45) Date of Patent: Apr. 16, 2013

(54) VEHICLE CONTROL DEVICE, VEHICLE CONTROL METHOD AND COMPUTER PROGRAM

(75) Inventors: Yoshito Kondou, Anjo (JP); Takayuki Miyajima, Anjo (JP); Atsushi Takeuchi, Anjo (JP); Yoshiyuki Yasui, Kariya (JP); Hiroyuki Kodama, Kariya (JP)

(73) Assignee: Aisin AW Co., Ltd. (JP)

( * ) Notice: Subject to any disclaimer, the term of this patent is extended or adjusted under 35 U.S.C. 154(b) by 782 days.

(21) Appl. No.: 12/289,998

(22) Filed: Nov. 10, 2008

(65) Prior Publication Data

US 2009/0192683 A1 Jul. 30, 2009

(30) Foreign Application Priority Data

Nov. 16, 2007 (JP) ................................ 2007-298079
Mar. 18, 2008 (JP) ................................ 2008-068946
Mar. 28, 2008 (JP) ................................ 2008-086132

(51) Int. Cl.
*G06F 7/00* (2006.01)
*G06F 7/70* (2006.01)

(52) U.S. Cl.
USPC .............................................. 701/53; 701/70

(58) Field of Classification Search ............ 701/41, 701/87, 93, 95, 301, 53, 70; 340/435, 436, 340/903, 933; 342/70, 81, 107, 455; 180/167, 180/170; 356/5.01
See application file for complete search history.

(56) References Cited

U.S. PATENT DOCUMENTS

| | | | | |
|---|---|---|---|---|
| 5,530,651 A * | 6/1996 | Uemura et al. | ............... | 701/301 |
| 5,871,062 A * | 2/1999 | Desens et al. | ................. | 180/169 |
| 6,044,321 A * | 3/2000 | Nakamura et al. | ............... | 701/96 |
| 6,269,307 B1 * | 7/2001 | Shinmura et al. | ............. | 701/301 |
| 6,282,483 B1 * | 8/2001 | Yano et al. | ........................ | 701/96 |
| 6,353,788 B1 | 3/2002 | Baker et al. | ...................... | 701/96 |
| 6,405,132 B1 * | 6/2002 | Breed et al. | ..................... | 701/301 |
| 6,571,176 B1 * | 5/2003 | Shinmura et al. | ............. | 701/301 |
| 6,720,920 B2 * | 4/2004 | Breed et al. | ..................... | 342/386 |
| 6,889,140 B2 * | 5/2005 | Isogai et al. | .................. | 701/301 |
| 7,016,783 B2 * | 3/2006 | Hac et al. | ....................... | 701/301 |
| 7,085,637 B2 * | 8/2006 | Breed et al. | ..................... | 701/38 |
| 7,406,373 B2 * | 7/2008 | Kubota et al. | ................... | 701/41 |
| 7,519,471 B2 * | 4/2009 | Shibata et al. | ................. | 701/211 |
| 7,729,857 B2 * | 6/2010 | Mudalige et al. | ............. | 701/301 |
| 7,848,884 B2 * | 12/2010 | Kawasaki | ...................... | 701/301 |
| 2004/0145238 A1 | 7/2004 | Seto et al. | ....................... | 303/193 |
| 2004/0155811 A1 | 8/2004 | Albero et al. | .................... | 342/70 |

(Continued)

FOREIGN PATENT DOCUMENTS

JP 61-088058 5/1986
JP 63-176851 7/1988

(Continued)

*Primary Examiner* — James Trammell
*Assistant Examiner* — Majdi Alsomiri
(74) *Attorney, Agent, or Firm* — Bacon and Thomas, PLLC

(57) ABSTRACT

An anti-collision control is provided under circumstances where it is determined that there is a risk of collision between a host vehicle and a preceding vehicle. The anti-collision control utilizes host vehicle information, preceding vehicle information, and surrounding road conditions to determine whether or not a collision with the preceding vehicle can be avoided through a steering operation. If avoidance is determined to be possible, then a shift-hold control is applied to the AT, whereas if avoidance is determined to be impossible, then a down-shift control is applied to the AT.

10 Claims, 12 Drawing Sheets

U.S. PATENT DOCUMENTS

| | | | |
|---|---|---|---|
| 2004/0193374 A1 | 9/2004 | Hac et al. | 701/301 |
| 2005/0134440 A1* | 6/2005 | Breed | 340/435 |
| 2007/0129891 A1 | 6/2007 | Yano et al. | 701/301 |
| 2008/0300766 A1* | 12/2008 | Kumabe et al. | 701/98 |
| 2009/0043474 A1* | 2/2009 | Nakai et al. | 701/70 |
| 2009/0048751 A1* | 2/2009 | Nakai et al. | 701/70 |
| 2009/0099728 A1* | 4/2009 | Ichinose et al. | 701/39 |
| 2009/0237226 A1* | 9/2009 | Okita | 340/435 |

FOREIGN PATENT DOCUMENTS

| | | |
|---|---|---|
| JP | 02-128935 | 5/1990 |
| JP | 06-298022 | 10/1994 |
| JP | 2002-269696 | 9/2002 |
| JP | 2003-175809 | 6/2003 |
| JP | 2004017710 A | 1/2004 |
| JP | 2004-237813 | 8/2004 |
| JP | 2005-138623 | 6/2005 |
| JP | 2007-034684 | 2/2007 |
| JP | 2007-034988 | 2/2007 |
| JP | 2007-145314 | 6/2007 |
| JP | 2007-145314 A | 6/2007 |

\* cited by examiner

AVOIDANCE MANEUVER NOT POSSIBLE
WITH RESPECT TO PRECEDING VEHICLE (2)

VEHICLE CONTROL DEVICE, VEHICLE CONTROL METHOD AND COMPUTER PROGRAM

The disclosures of Japanese Patent Application Nos. 2007-298079, 2008-068946, and 2008-086132 filed on Nov. 16, 2007, Mar. 18, 2008, and Mar. 28, 2008, respectively, including the specification, drawings and abstract are incorporated herein by reference in their entirety.

BACKGROUND OF THE INVENTION

1. Field of the Invention

The present invention relates to a vehicle control device, a vehicle control method, and a computer-readable medium having, encoded thereon, a program for providing appropriate vehicle control responsive to detection of an object ahead.

2. Description of the Related Art

Vehicle control devices have been proposed in the past for obtaining various information regarding vehicle travel such as a current position identified by GPS or the like and road information obtained from map data in a navigation device, as well as for providing driver notification and driving assistance, and for intervening to automatically control driving to prevent a vehicle accident. This type of vehicle control device executes vehicle controls at diverse timings and based on various conditions. In particular, when an object such as another vehicle ahead is detected during vehicle travel, in order to avoid contact with the object or mitigate damage upon contact, the vehicle control device performs braking to decelerate and turns the vehicle.

Japanese Patent Application Publication No. JP-A-2007-145152 (pages 6 to 7, FIGS. 4 to 6), for example, describes a braking control system, wherein based on the speed of host vehicle, the speed of an object ahead of the host vehicle, and a positional relationship between the host vehicle and the object, it is determined whether contact with the object can be avoided by steering the host vehicle. If it is determined that contact with the object cannot be avoided by steering, then the braking control decelerates the vehicle.

In cases where the host vehicle is approaching an object ahead, contact with that object can be avoided by:

(1) Maintaining a safe distance from the object by braking the host vehicle while keeping the current direction of vehicle travel.

(2) Performing an avoidance maneuver by steering to change the travel direction of the host vehicle so that the vehicle goes to the right or left of the object.

However, in order to avoid contact with the object by braking (method 1), the driver must conduct a braking operation which requires more time than that required to avoid contact with the object by steering (method 2).

In the vehicle control system described in Japanese Patent Application Publication No. JP-A-2007-145152, if it is determined that contact with an object is unavoidable merely by steering (method 2), namely, if contact with an object cannot be avoided regardless of any vehicle steering operation, then braking control must be initiated. The determination of whether contact with the object is avoidable by steering is based on the relative speed and the positional relationship between the host vehicle and the object as described above, that is, based only on relative relationships between the host vehicle and the object.

However, the vehicle cannot avoid an object ahead by moving into the right or left adjacent lane if conditions do not allow such an avoidance maneuver, such as when there is no adjacent lane next to the lane in which the vehicle is traveling and when, if there is an adjacent lane next to the lane in which the vehicle is traveling, there is another object (e.g. a traveling vehicle) in the adjacent lane. If a determination is made based solely on a relative relationship between the host vehicle and the object as in the related art, then it is impossible to determine that the vehicle is in a situation where contact with the object cannot be avoided by steering.

SUMMARY OF THE INVENTION

The present invention was devised in order to resolve problems with the above related art, and it is an object of the present invention to provide a vehicle control system, a vehicle control method, and a computer-readable medium encoded with a computer program, which are capable of determining whether or not a vehicle is in a situation where contact with an object can be avoided through steering by using information pertaining to an adjacent lane.

Accordingly, in a first aspect, the present invention provides a vehicle control system which uses information pertaining to adjacent lanes to determine situations where contact with an object is unavoidable through steering, i.e., whether or not the vehicle is in a situation where contact with an object cannot be avoided regardless of any vehicle steering operation subsequently performed. As a consequence, the timing at which the braking control is initiated can be advanced, making it possible to reduce impact upon contact with an object.

According to a second aspect of the present invention, it is possible to determine whether or not contact with an object can be avoided through steering in accordance with a determination of whether or not there is an adjacent lane and, if there is an adjacent lane, whether or not there is another object in that adjacent lane, and such a determination can be performed more accurately and faster than in the past.

According to a fourth aspect, the present invention provides a computer-readable medium having encoded thereon a program for using information pertaining to adjacent lanes and configuring a computer to determine situations where contact with an object is unavoidable through steering, i.e., whether or not the vehicle is in a situation where contact with an object cannot be avoided regardless of any vehicle steering operation subsequently performed. As a consequence, the timing at which the braking control is initiated can be advanced, making it possible to reduce impact upon contact with an object.

DETAILED DESCRIPTION OF THE PREFERRED EMBODIMENTS

Preferred embodiments of a vehicle control device according to the present invention will now be described in detail below with reference to the accompanying drawings.

A vehicle control device 1 according to a preferred embodiment of the present invention will first be explained with reference to FIG. 1 which is a schematic configuration diagram of the vehicle control device 1.

Figure 1:
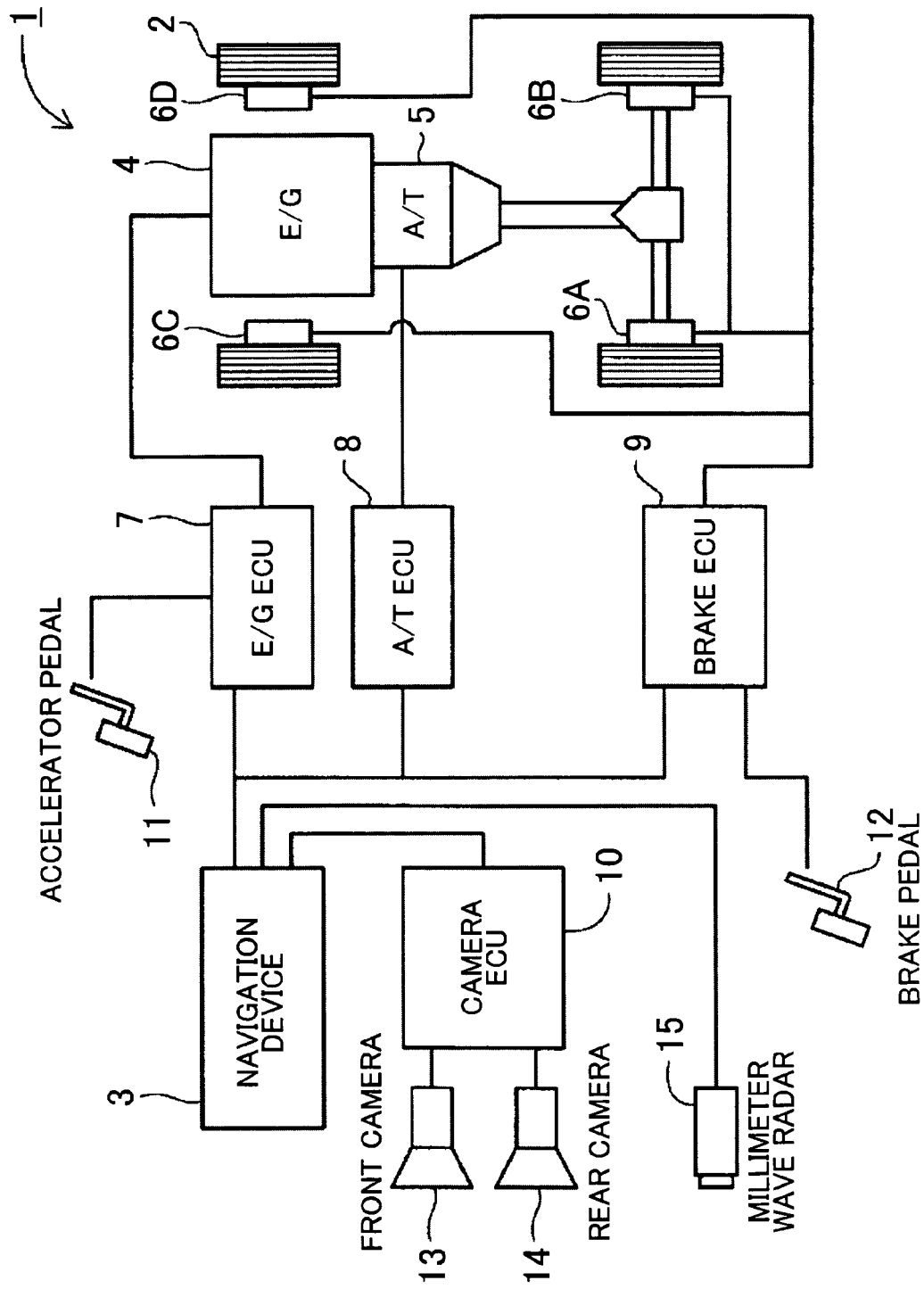
FIG. 1 is a block diagram of a vehicle control device (system) according to an embodiment of the present invention.

As illustrated in FIG. 1, the vehicle control device 1 includes a navigation device 3, an engine 4, an automatic transmission (AT) 5, brakes 6A to 6D, an engine ECU 7, AT ECU 8, a brake ECU 9, a camera ECU 10, an accelerator pedal 11, a brake pedal 12, a front camera 13, a rear camera 14, millimeter wave radars 15, 15 and the like, installed in a vehicle 2.

Here, the navigation device 3 is provided in a center console in the interior of the vehicle 2. The navigation device 3 is equipped with a liquid crystal display for showing a map or a search route to a destination, and a speaker for output of voice route guidance. In addition to identifying a current location of the vehicle 2 using GPS or the like, once a destination is set, the navigation device 3 searches for and sets a route to the destination and provides guidance along the set route using the liquid crystal display and the speaker. Furthermore, the navigation device 3 in this embodiment performs a vehicle control such as down-shifting or not shifting the AT, that enables the most appropriate avoidance maneuver in execution of anti-collision control (described later). The navigation device 3 also provides vehicle braking control for reducing impact upon collision, specifically, down-shifting down the AT and increasing braking pressure generated by the brakes 6A to 6D.

The engine 4 is an internal combustion engine or the like powered by combustion of a fuel such as gasoline, diesel, or ethanol, and is used as a power source for the vehicle 2. An engine torque output from the engine 4 is transmitted to a vehicle wheel via the AT 5, a propeller shaft, and a drive shaft, thereby propelling the vehicle 2.

The AT 5 is a transmission which functions to automatically change transmission gear ratio in accordance with vehicle speed and engine rpm. The AT 5 shifts the engine torque generated by the engine 4 and transmits the shifted torque to the propeller shaft. Note that in the present embodiment, either a down-shift control that increases the transmission gear ratio or a shift-hold control that fixes the transmission gear ratio is used in the anti-collision control described later. The AT 5 may be a continuously variable transmission (CVT).

The brakes 6A to 6D are respectively provided in association with corresponding vehicle wheels disposed at the front and rear, and right and left sides of the vehicle 2, and are mechanisms that use friction to decrease rotational speed of the vehicle wheels. The brakes 6A to 6E may be drum brakes and/or disc brakes.

The engine electronic control unit (ECU) 7 includes a CPU, a RAM, and a ROM (not shown), and is an electronic control unit that controls the engine 4. The engine ECU 7 is connected with the navigation device 3 and the accelerator pedal 11. Based on operation of the accelerator pedal 1, the engine ECU 7 controls the opening of the throttle valve of the engine 4.

The AT ECU 8 includes a CPU, a RAM, and a ROM (not shown), and is an electronic control unit that controls the AT 5. The AT ECU 8 is connected with the navigation device 3. Based on a command signal from the navigation device 3, the AT ECU 8 controls the transmission gear ratio of the AT.

The brake ECU 9 includes a CPU, a RAM, and a ROM (not shown), and is an electronic control unit that controls the brakes 6A to 6D. The brake ECU 9 is connected with the navigation device 3 and the brake pedal 12. Based on a command signal from the navigation device 3 or operation of the brake pedal 12, the brake ECU 9 controls the braking by the brakes 6A to 6D.

The camera ECU 10 includes a CPU, a RAM, and a ROM (not shown), and is an electronic control unit that controls the front camera 13 and the rear camera 14.

The accelerator pedal 11 is provided on the driver seat side in the interior of the vehicle 2, for operation by the driver. When the driver operates the accelerator pedal 11, a signal representing the degree of depression of the accelerator pedal 11 is sent to the engine ECU 7, which adjusts the opening of the throttle valve in accordance with that signal.

The brake pedal 12 is similarly provided on the driver seat side in the interior of the vehicle 2 for operation by the driver. When the driver operates the brake pedal 12, a signal representing the degree of depression of the brake pedal 12 is sent to the brake ECU 9, which adjusts the amount of braking.

The front camera 13 and the rear camera 14 each use a solid-state image sensor such as a CCD, for example, and are attached centrally above the regions of the license plates at the front and rear of the vehicle 2. The front camera 13 and the rear camera 14 are each installed with a line of sight (focal axis) at a predetermined angle downward relative to the horizontal. During travel, an area ahead of the vehicle direction and an area behind the vehicle are respectively imaged. The vehicle control device 1 detects road conditions in the vicinity of the vehicle 2, as well as center dividers and road markings, such as lane lines, formed on the road surface in the area of the vehicle 2, from images taken by the front camera 13 and the rear camera 14 as described later. Based on the detected lane marker and center divider, the lane in which the vehicle 2 is currently traveling (hereinafter referred to as a travel lane) is identified (e.g. the leftmost lane or the second lane from the right is identified). Note that the term "lane marker" is intended to include road center lines, lane boundary lines, lane edges, lines indicating pedestrian crosswalks, and the like.

The millimeter wave radar 15 is an object detection sensor with a recognition range encompassing a predetermined range around the vehicle (e.g. a range of 100 meters in front of and behind the vehicle 2), and four are respectively installed at a total of four locations: near the right and left door mirrors and centrally and above the regions of the license plates mounted at the front and back of the vehicle 2. In this embodiment, each millimeter wave radar 15 includes a radio wave sender and a radio wave receiver. The millimeter wave radar 15 radiates a millimeter wave and receives radio waves reflected off an object. The vehicle control device 1 determines the position of an object and the speed of the object relative to the host vehicle based on a difference in frequency generated by propagation time and the Doppler Effect. Thus, the vehicle control device 1 in the present embodiment detects the position and relative speed of another vehicle (object) traveling near the host vehicle using the millimeter wave radar 15.

In use of the vehicle control device 1 according to the present embodiment, an object such as another vehicle ahead of the vehicle 2 is detected and anti-collision control is executed under conditions where there is a risk of the vehicle 2 crashing with the object.

The anti-collision control will be briefly explained here. In the anti-collision control, it is first determined from conditions of travel of the vehicle and surrounding conditions whether a collision with an object can be avoided by a steering operation. If it is determined that a collision with the object can be avoided by a steering operation, then the AT 5 is not shifted and a steering operation to avoid the object is recommended to the driver. On the other hand, if it is determined that a collision with the object cannot be avoided by a steering operation, then a braking control of the vehicle 2 is executed wherein the AT 5 is down-shifted and the brakes 6A to 6D are operated.

Next, the navigation device 3 of the above vehicle control device 1 will be described in detail with reference to FIG. 2 which is a block diagram schematically showing a control system of a navigation device 3 according to the present embodiment.

Figure 2A:
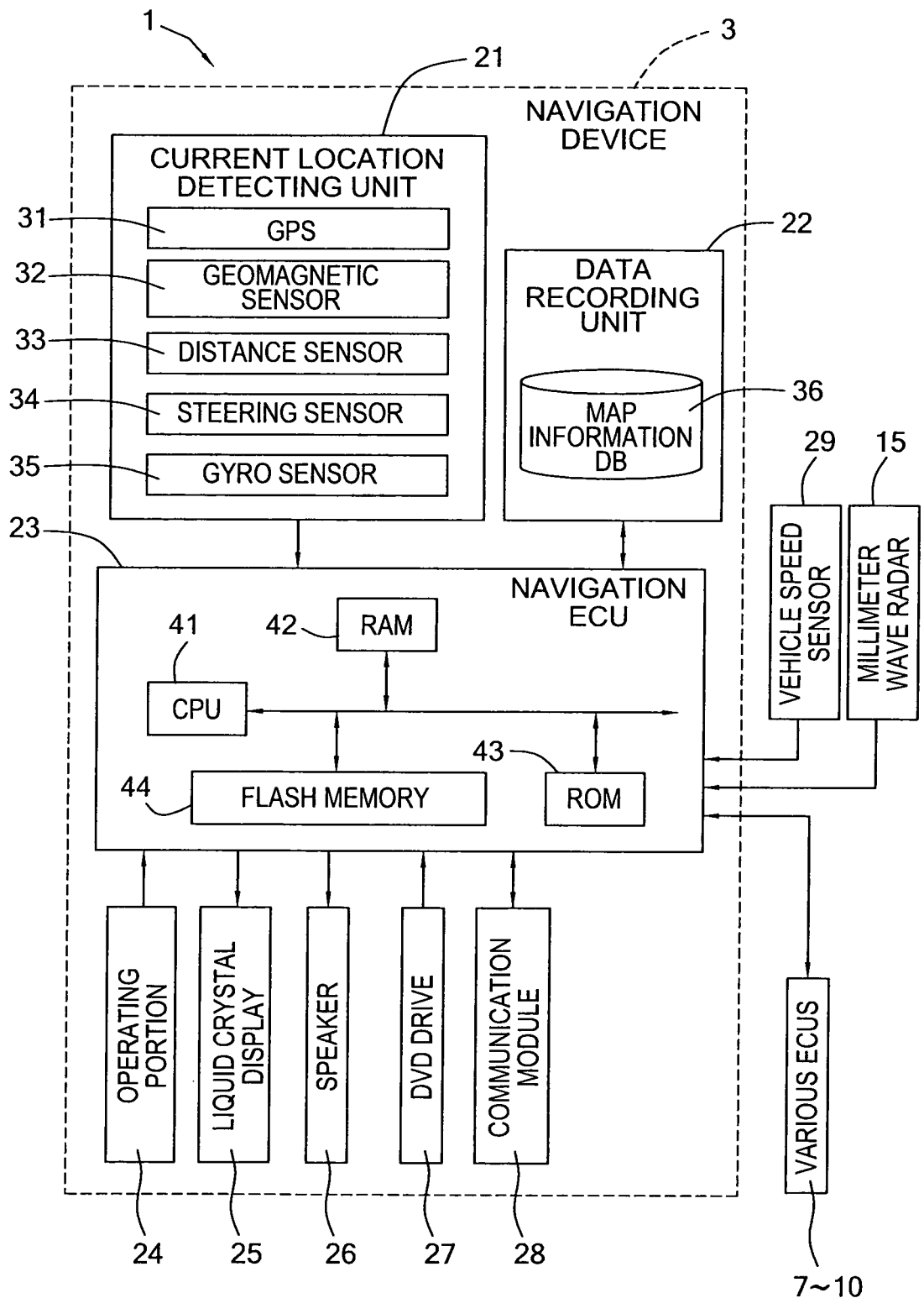
FIG. 2A is a block diagram of a vehicle control system of the present invention combined with a navigation device.
Figure 2B:
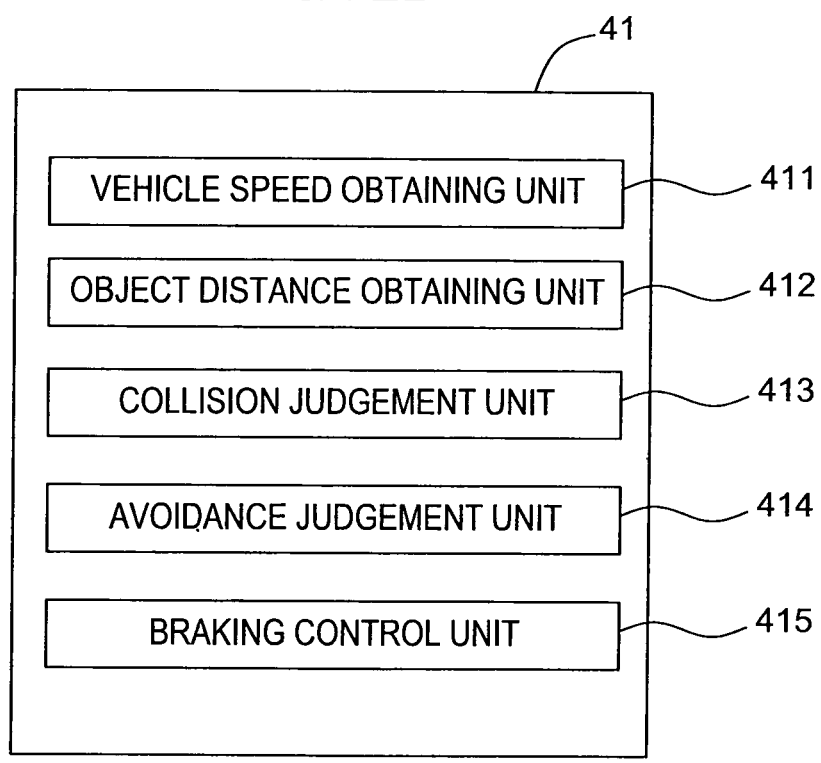
FIG. 2B is a block diagram of CPU 41.

As illustrated in FIGS. 2A and 2B, the navigation device 3 of the present embodiment includes: a current location detecting unit 21 that detects the current location of the host vehicle; a data recording unit 22 in which various data is recorded; a navigation ECU 23 which includes a CPU 41 (a vehicle speed obtaining unit 411, an object distance obtaining unit 412, a collision judgment unit 413, an avoidance judgment unit 414, and a braking control unit 415) that executes various computational routines based on input information; an operating portion 24 that accepts input from a user; a liquid crystal display 25 that shows a map of the area around the host vehicle; a speaker 26 that outputs voice route guidance; a DVD drive 27 that reads out information from a DVD serving as a storage medium which stores a program; and a communication module 28 that enables communication with an information center such as a traffic information center. The navigation ECU 23 is also connected with a vehicle speed sensor 29 that detects the travel speed of the host vehicle and the millimeter wave radar units 15 described earlier.

The structural components forming the navigation device 3 will now be explained in order below.

The current location detecting unit 21 is formed from a GPS 31, a geomagnetic sensor 32, a distance sensor 33, a steering sensor 34, a gyro sensor 35 serving as an orientation detecting unit, an altimeter (not shown), and the like, and is capable of detecting the orientation, current location, and so forth of the host vehicle.

The data recording unit 22 is provided with a hard drive (not shown) that serves as an external storage device and a recording medium, as well as a recording head (not shown) that serves as a driver for reading a map information database 36 and a predetermined program or the like stored on the hard drive, and for writing data on the hard drive.

Here, the map information database 36 stores various map data required for route guidance, traffic information guidance, and map display. Specifically, the map information database 36 includes link data pertaining to a road (link) configuration, node data pertaining to node points, road attribute data pertaining to road attributes, facility data pertaining to facilities such as restaurants and parking lots, intersection data pertaining to intersections, search data for searching a route, search data for searching a point, and image drawing data for drawing an image of a map, a road, traffic information, and so forth on the liquid crystal display 25. The road attribute data includes information related to, for example, whether a road is one-way, the number of lanes on a road, traffic lane width, sidewalk width, and whether or not there is a center divider.

The navigation electronic control unit (ECU) 23 is an electronic control unit that performs overall control of the navigation device 3, such as guidance route setting processing that, when a destination is selected, sets a guidance route from the current location to the destination, in addition to the anti-collision control and the like. Furthermore, the navigation ECU 23 is provided with a CPU 41 serving as a computing device and a control device, as well as internal memory devices such as: a RAM 42 that is used as a working memory for the CPU 41 in executing various computational routines, and that also stores route data for use when a route is searched; a ROM 43 that stores a control program and vehicle control programs (see FIGS. 3 to 6); and a flash memory 44 that records a program read out from the ROM 43.

The operating portion 24 is used for inputting a place of departure that serves as a guidance start point and a destination that serves as a guidance end point, and has a plurality of operation switches (not shown) that include various keys and buttons. Based on switch signals output from the switches or the like when operated, the navigation ECU 23 executes control routines in order to provide various corresponding operations. Alternatively, the operating portion 24 can be a touch panel provided as a front screen of the liquid crystal display 25.

The liquid crystal display 25 shows a road map image, traffic information, operation guidance, an operation menu, key guidance, a guidance route from the current position to the destination, guidance information along the guidance route, as well as news, weather forecasts, the time of day, mail, and television programs. In the navigation device 3 according to the present embodiment, in particular during the anti-collision control, the liquid crystal display 25 shows a caution message that recommends an avoidance operation and a caution message notifying the driver that the braking control will be executed.

The speaker 26 outputs traffic information guidance and voice guidance that guides travel along the guidance route based on a command from the navigation ECU 23. In the navigation device 3 according to the present embodiment, in particular during the anti-collision control, the speaker 26 outputs voice guidance that recommends an avoidance operation and voice guidance notifying the driver of execution of braking control.

The DVD drive 27 is a drive for reading data recorded on a recording medium such as a DVD or a CD. Based on the data readout, the map information database 36 is updated.

The communication module 28 is a communication apparatus for receiving traffic information that includes congestion information, regulatory information, and traffic accident information transmitted from a VICS (registered trademark: Vehicle Information and Communication System) center, a probe center, or the like. The communication module 28 is a mobile phone or a DCM, for example.

The vehicle speed sensor 29 is a sensor for detecting distance traveled by the vehicle and vehicle speed. The vehicle speed sensor 29 generates a pulse with rotation of the vehicle wheels, and outputs a pulse signal to the navigation ECU 23. The navigation ECU 23 then calculates the distance traveled based on the counted number of generated pulses.

Figure 3:
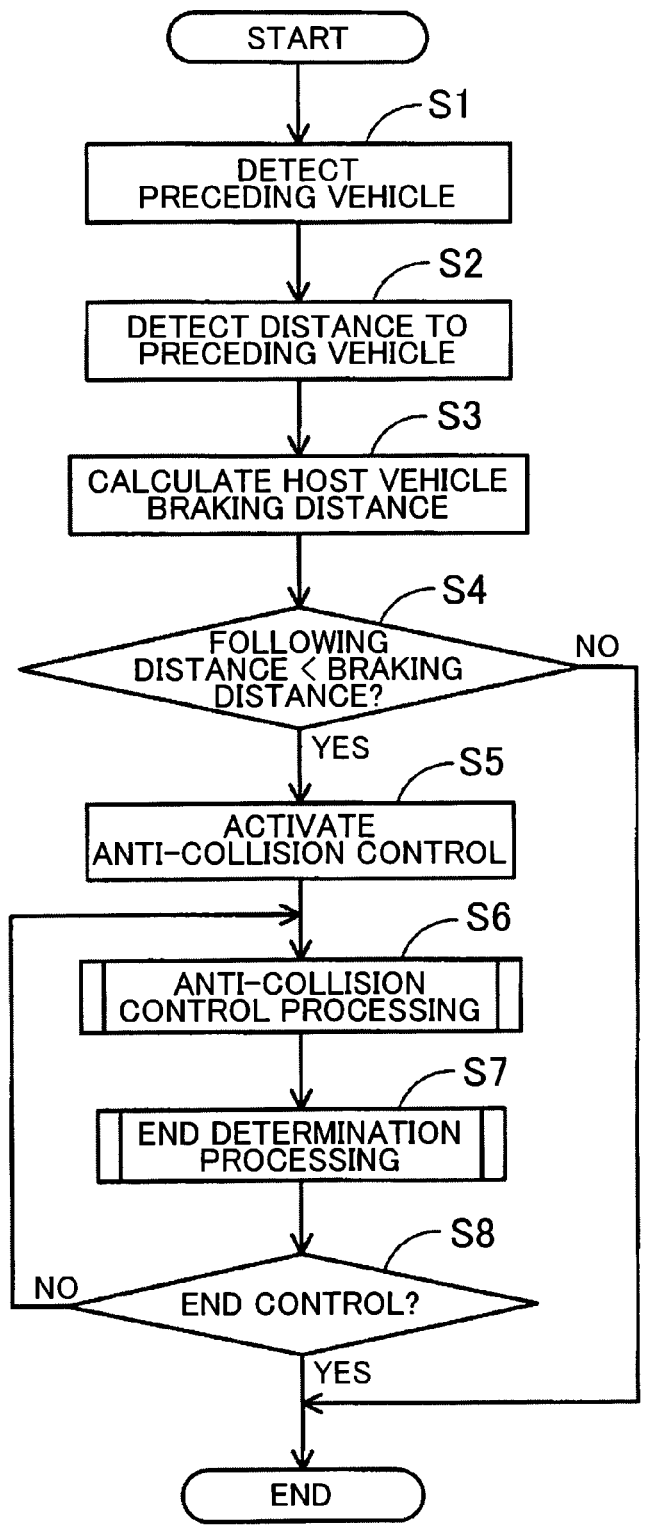
FIG. 3 is a flowchart of a vehicle control program executed by the vehicle control system in accordance with the present invention.

Next, a vehicle control program executed by the navigation ECU 23 in the vehicle control device 1 having the above-described configuration will be explained with reference to FIGS. 3 to 6. FIG. 3 is a flowchart of the vehicle control processing program according to the present embodiment. The vehicle control program is repeatedly executed at a pre-determined interval of time (e.g. 200 milliseconds) after the ignition of the vehicle is switched on, and is a program that performs an AT control based on whether or not it is possible to avoid an object (e.g. another vehicle) detected ahead in the travel direction of the vehicle. The programs represented by the flowcharts of FIGS. 3 to 6 are stored in the RAM 42 and the ROM 43 and are executed by the CPU 41. In describing the embodiments which follow, a preceding vehicle traveling ahead in the travel direction of the host vehicle is detected as an object.

Figure 7:
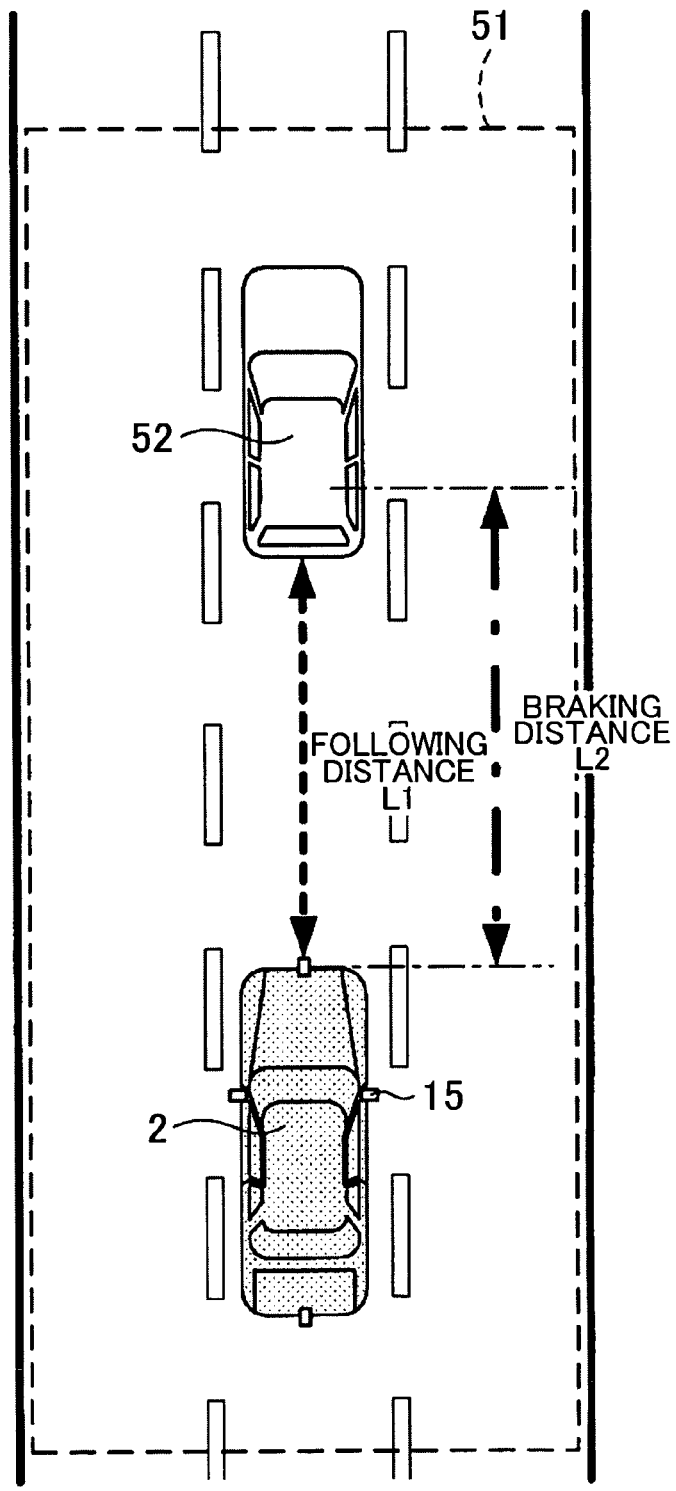
FIG. 7 illustrates an example of a traffic situation where it is determined that a host vehicle may collide with a preceding vehicle.

In executing the vehicle control program, first, the CPU 41 in step (abbreviated to "S" below) 1 detects a preceding vehicle (object) at a position ahead in the travel direction of the host vehicle using the millimeter wave radar 15. In this embodiment, millimeter wave radars 15 are installed at a total of four locations, front, rear, right, and left surfaces of the vehicle 2 as illustrated in FIG. 7, and the millimeter wave radars 15 detect location and relative speed of a target within a recognition range 51 around the host vehicle 2. As shown in FIG. 7, for example, when there is a vehicle 52 traveling within the recognition range 51 of the millimeter wave radar 15 and in the same lane as the host vehicle 2, then the vehicle 52 is detected as a preceding vehicle in S1.

Next in S2, the CPU 41 detects the distance from the host vehicle to the preceding vehicle using the millimeter wave radar 15, which distance is shown in FIG. 7 as the "following distance" L1. In executing S2 the programmed CPU 41 functions as the object distance obtaining unit 411.

In S3 the CPU 41 detects the vehicle speed of the host vehicle using the vehicle speed sensor 29, and calculates a braking distance L2 of the host vehicle based on the detected vehicle speed. Here, the braking distance refers to a distance that the vehicle travels after the driver starts braking by pressing the brake pedal 12 until the vehicle comes to a complete stop. The method of calculating the braking distance L2 is conventional. The braking distance L2 varies depending on the day's weather, tire wear, road inclination, and the like, which information the navigation device 3 obtains in advance. In execution of S3, the programmed CPU 41 functions as the vehicle speed obtaining unit 412.

Subsequently in S4 the CPU 41 compares the following distance L1 to the preceding vehicle detected in S2 and the braking distance L2 of the host vehicle calculated in S3, and determines whether the following distance L1 is shorter than the braking distance L2.

Consequently, if it is determined that the following distance L1 is shorter than the braking distance L2 of the host vehicle as shown in FIG. 7 (YES at S4), then the CPU 41 determines that there is a risk of collision between the host vehicle and the preceding vehicle, and the routine proceeds to S5. In S5 the CPU 41 activates the anti-collision control which predicts in advance a collision between the traveling vehicle and an object, and attempts to mitigate damage by operating safety equipment. In the present embodiment, the anti-collision control is a control of the AT 5 that responds to a determination of the possibility of a collision with an object.

Figure 8:
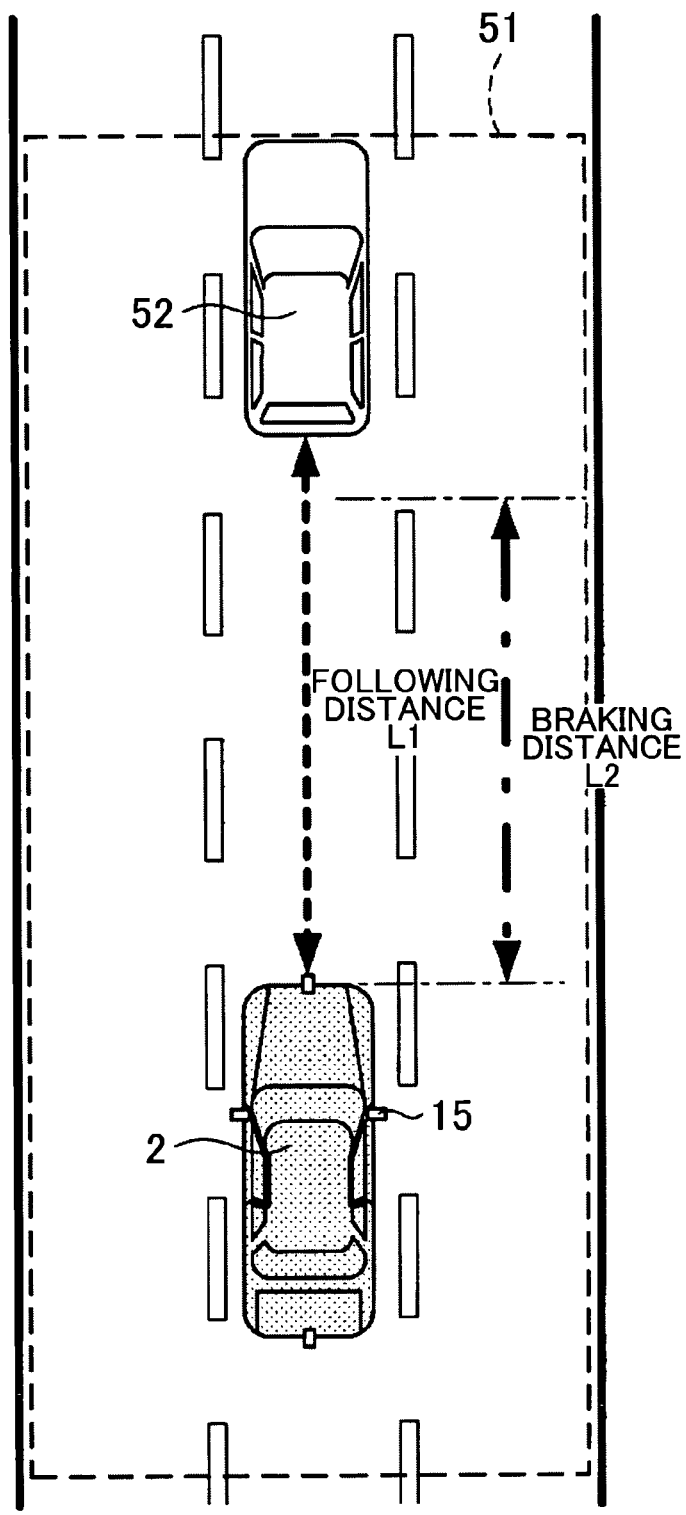
FIG. 8 illustrates an example of a traffic situation where it is determined that a host vehicle will not collide with a preceding vehicle.

If it is determined that the following distance L1 is longer than the braking distance L2 of the host vehicle as shown in FIG. 8 (NO in S4), then the CPU 41 determines that there is no risk of collision between the host vehicle and the preceding vehicle, the anti-collision control is not activated and the vehicle control processing is ended. In executing S4, the programmed CPU 41 functions as the collision judgment unit 413.

Figure 4:
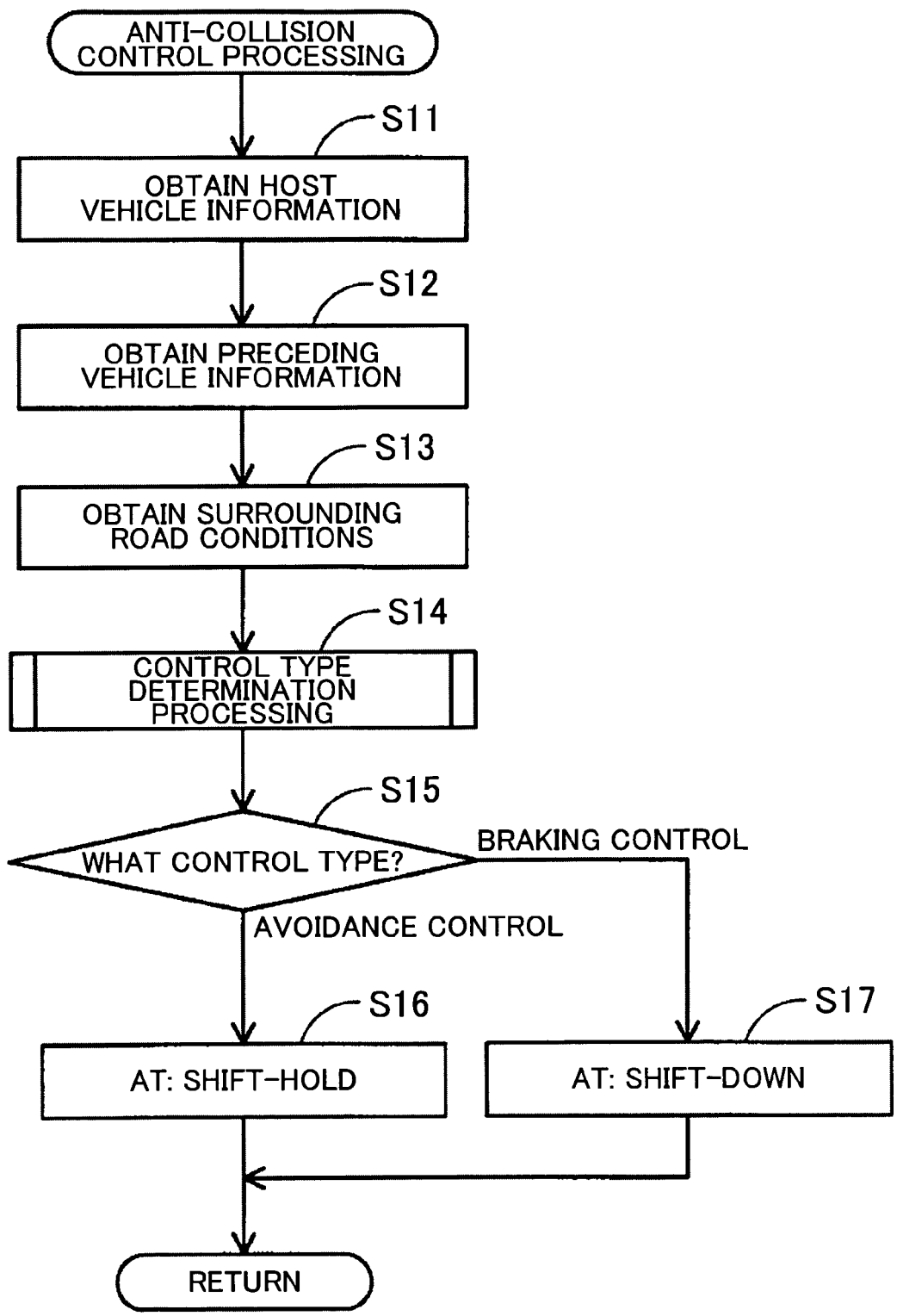
FIG. 4 is a flowchart of a subroutine for anti-collision control executed by the vehicle control device of the present invention.

Next in S6, the CPU 41 executes anti-collision control described in detail below with reference to FIG. 4. The anti-collision control determines whether a collision between the host vehicle and the preceding vehicle can be avoided by a steering operation and controls the AT 5 based on that determination.

Figure 6:
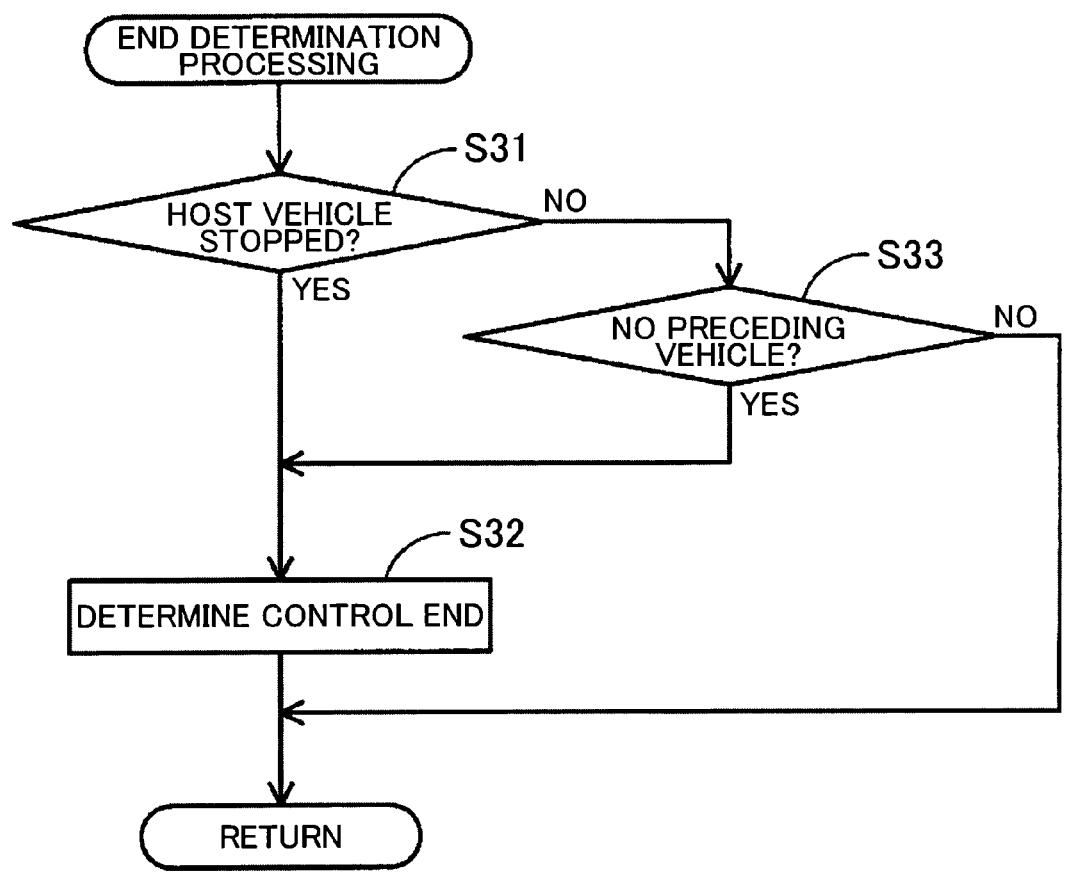
FIG. 6 is a flowchart of a subroutine for end determination processing executed by the vehicle control device of the present invention.

Next in S7, the CPU 41 executes end determination processing described later with reference to FIG. 6. Note that the end determination determines whether the risk of a collision between the host vehicle and the preceding vehicle has been eliminated as a result of execution of the anti-collision control.

In S8 it is determined whether or not to end the anti-collision control based on the end determination in S7. Specifically, if it is determined in S7 that the risk of a collision between the host vehicle and the preceding vehicle is eliminated, then the anti-collision control is ended; if it is determined that the risk of a collision between the host vehicle and the preceding vehicle is not eliminated, then it is judged that the anti-collision control should be continued.

If it is judged that the anti-collision control should be continued as a result of the determination in S8 (NO in S8), then the routine returns to S6 and the anti-collision control is continued. On the other hand, if it is determined that the anti-collision control should be ended (YES in S8), then the vehicle control processing is ended.

A subroutine for the anti-collision control processing in S6 will next be explained with reference to FIG. 4 which is a flowchart of the subroutine for anti-collision control.

In S11 the CPU 41 first obtains host vehicle information pertaining to the host vehicle. The host vehicle information obtained in S11 includes the current location, travel direction, vehicle speed, and lane position of the host vehicle. In determining the current location of the host vehicle, information from the GPS 31 and map-matching employing the map data stored in the map information database 36 are used to identify the current location of the host vehicle on a map. The travel direction and the vehicle speed of the host vehicle are detected using the gyro sensor 35 and the vehicle speed sensor 29. In addition, the lane position in which the host vehicle is traveling is identified based on an image taken by the rear camera 14.

The process for identifying the lane position in which the host vehicle is traveling will be briefly described below. First, the CPU 41 recognizes, by image recognition processing, a lane marker and a center divider from an image taken by the rear camera 14. Based on the result of the image recognition processing, the existence of a lane marker and a center divider, as well as the type of lane marker are detected. Next the traffic lane in which the host vehicle is traveling is identified based on the detected lane marker and center divider, and the configuration of the road in which the host vehicle is currently traveling as obtained from the map information database 36. Note that if the road on which the host vehicle is traveling has only one lane, then there is no need to perform the process for identification of the lane position.

In S12 the CPU 41 next obtains preceding vehicle information pertaining to the preceding vehicle. The preceding vehicle information obtained in S12 includes the following distance L1 detected in S2, as the distance from the host vehicle to the preceding vehicle and the relative speed of the preceding vehicle with respect to the host vehicle. The detection of the relative speed of the preceding vehicle is by use of the millimeter wave radar 15.

In S13 the CPU 41 obtains the surrounding road conditions of the host vehicle. The surrounding road conditions obtained in S13 include the condition of an adjacent lane that is next to the lane in which the host vehicle is currently traveling. Specifically, information (including the location and relative speed) pertaining to an object such as another vehicle traveling in the adjacent lane or a sign placed within the adjacent lane is obtained. The detection of the surrounding road conditions employs use of the front camera 13, the rear camera 14, and the millimeter wave radar 15.

Figure 5:
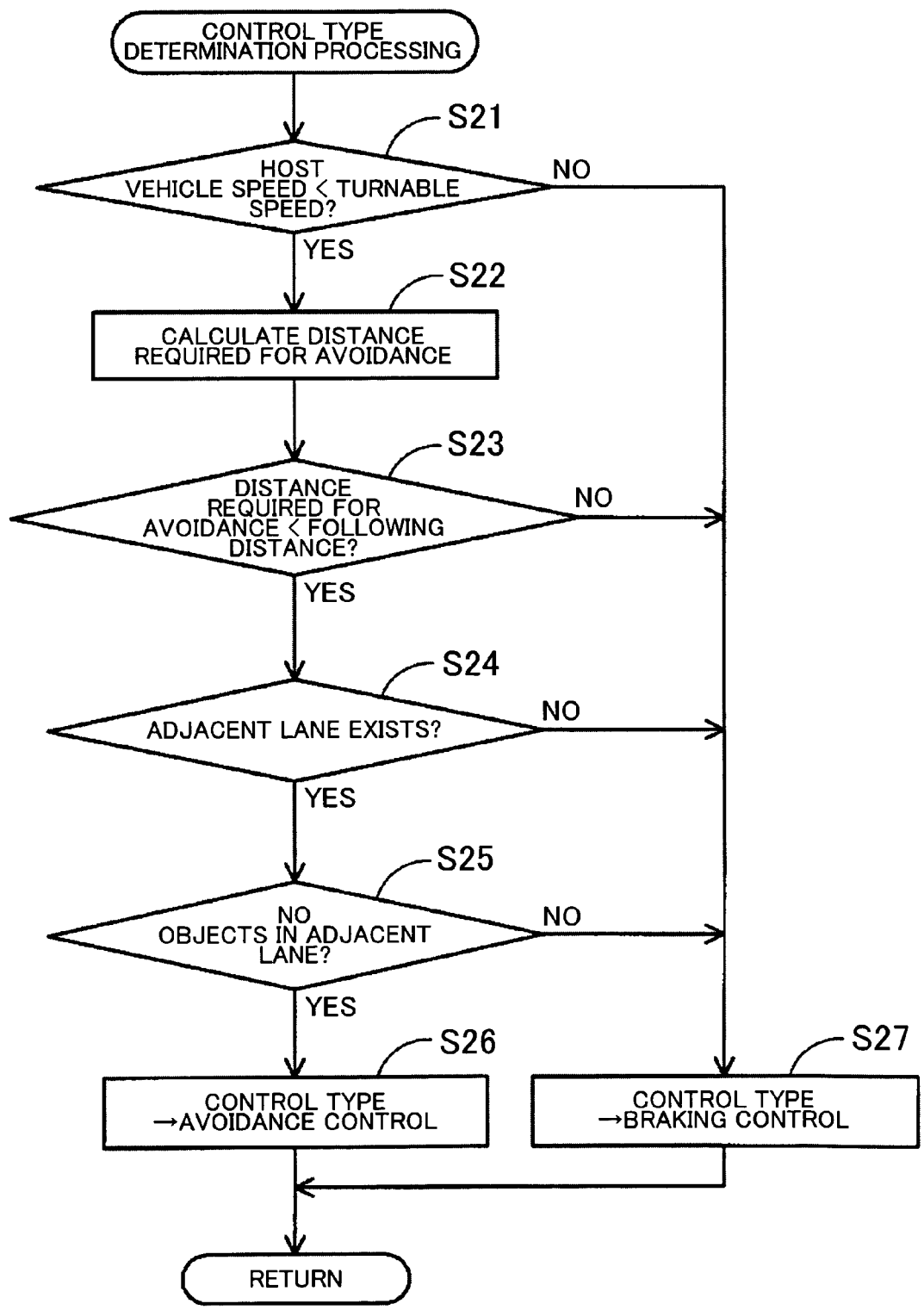
FIG. 5 is a flowchart of a subroutine for control type determination executed by the vehicle control device of the present invention.

Next in S14, the CPU 41 executes a control type determination subroutine as illustrated by the flowchart shown in FIG. 5. The control type determination process determines the appropriate type of control to be performed by the anti-collision control: (a) an avoidance control that recommends an avoidance maneuver to the driver in order to prevent a collision with an object or (b) a braking control for deceleration in order to mitigate an impact upon collision with an object.

In S15 the CPU 41 determines whether either (a) the avoidance control or (b) the braking control has been selected as a result of the control type determination in S14.

If the avoidance control (a) has been selected, then the CPU 41 executes a shift-hold control that fixes the transmission gear ratio of the AT 5 via the AT ECU 8 (S16). Thus, even when the vehicle performs an avoidance maneuver as a steering operation by the driver, there is no down-shifting during the avoidance maneuver, thereby minimizing skidding of the vehicle. It is also preferred that in S16 a caution regarding the execution of an avoidance maneuver is simultaneously communicated to the driver using the liquid crystal display 25 and the speaker 26. Note that in addition to the caution regarding the execution of an avoidance maneuver, guidance regarding a steering direction may also be provided. Alternatively or in addition, automatic control for steering assistance may be executed.

If the braking control (b) has been selected, then the CPU 41 executes a down-shift control that increases the transmission gear ratio of the AT 5 via the AT ECU 8 (S17). Thus, even if a collision with the object cannot be avoided, it is possible to mitigate an impact upon collision due to braking of the vehicle generated by an engine brake. In S17 the braking is preferably also performed simultaneously by all the brakes 6A to 6D. It is also preferable that a caution message regarding the execution of the braking control is communicated to the driver using the liquid crystal display 25 and the speaker 26. In executing S17 the programmed CPU 41 functions as the braking control unit 415.

A subroutine for the control type determination executed in S14 will now be explained with reference to FIG. 5 which is a flowchart of the subroutine.

In S21 the CPU 41 first determines whether the vehicle speed of the host vehicle obtained in S11 is less than a turnable speed which is the speed at which the vehicle can safely turn, and is set as a parameter for the host vehicle.

If it is determined that the vehicle speed of the host vehicle is less than the turnable speed (YES in S21), then the routine proceeds to S22. On the other hand, if it is determined that the vehicle speed of the host vehicle is equal to or greater than the turnable speed (NO in S21), then it is dangerous for the vehicle to perform an avoidance steering maneuver. Therefore, it is determined that the braking control (b), for deceleration in order to mitigate an impact upon collision with the object, is appropriate as the type of control performed by the anti-collision control (S27).

In S22 the CPU 41 calculates a distance required to avoid the preceding vehicle (hereinafter referred to as a required avoidance distance L3) based on the host vehicle information obtained in S11 and the preceding vehicle information obtained in S12.

Subsequently, in S23 the CPU 41 compares the required avoidance distance L3 obtained in S22 and the following distance L1 to the preceding vehicle, and determines whether or not the required avoidance distance L3 is shorter than the following distance L1.

Figure 9:
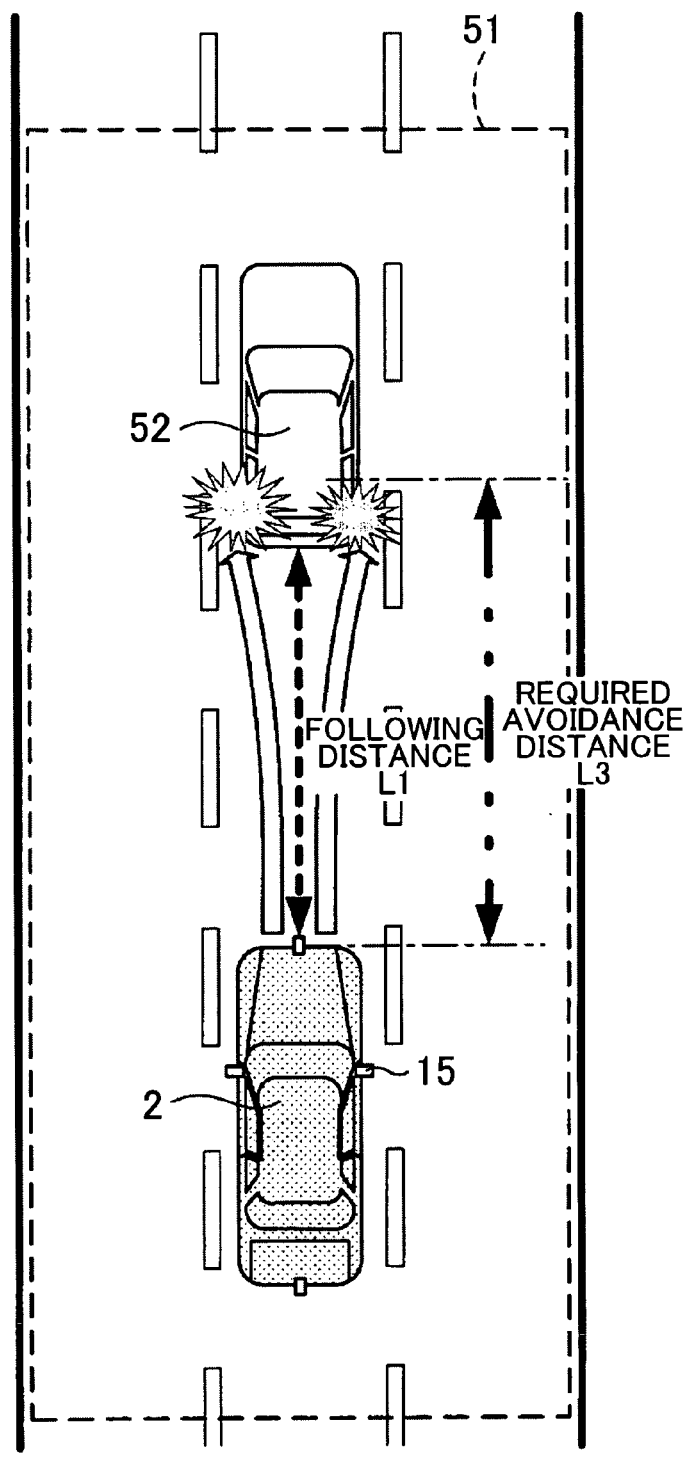
FIG. 9 illustrates an example of a traffic situation where it is determined that a collision with a preceding vehicle cannot be avoided through a steering operation.

If it is determined that the required avoidance distance L3 is shorter than the following distance L1 (YES in S23), then the routine proceeds to S25. Otherwise, if it is determined that the required avoidance distance L3 is longer than the following distance L1 as illustrated in FIG. 9 (NO in S23), then contact with the preceding vehicle cannot be avoided. Therefore, it is determined that the braking control (b) for deceleration in order to mitigate an impact upon collision with the object is appropriate as the type of control to be executed by the anti-collision control (S27).

In S23 the CPU 41 determines whether or not there is a lane adjacent to the lane in which the host vehicle is currently traveling, based on road information pertaining to the road on which the host vehicle is currently traveling. If it is determined that there is an adjacent lane (YES in S24), then the routine proceeds to S25. Conversely, if it is determined that no adjacent lane exists (NO in S24), then the preceding vehicle cannot be avoided by steering. Therefore, it is determined that the braking control for deceleration in order to mitigate an impact upon collision with the object is appropriate as the type of control to be executed by the anti-collision control (S27).

When no preceding vehicle information is obtained in S12, in S23 the CPU 41 determines that the required avoidance distance L3 is longer than the following distance L1 as illustrated in FIG. 9 (NO in S23).

In S25 the CPU 41 determines whether or not there is an object (e.g. a vehicle, sign, or the like) at a distance closer than the preceding vehicle in an adjacent lane next to the lane in which the host vehicle is currently traveling, based on information as to the surrounding road conditions obtained in S13.

Figure 10:
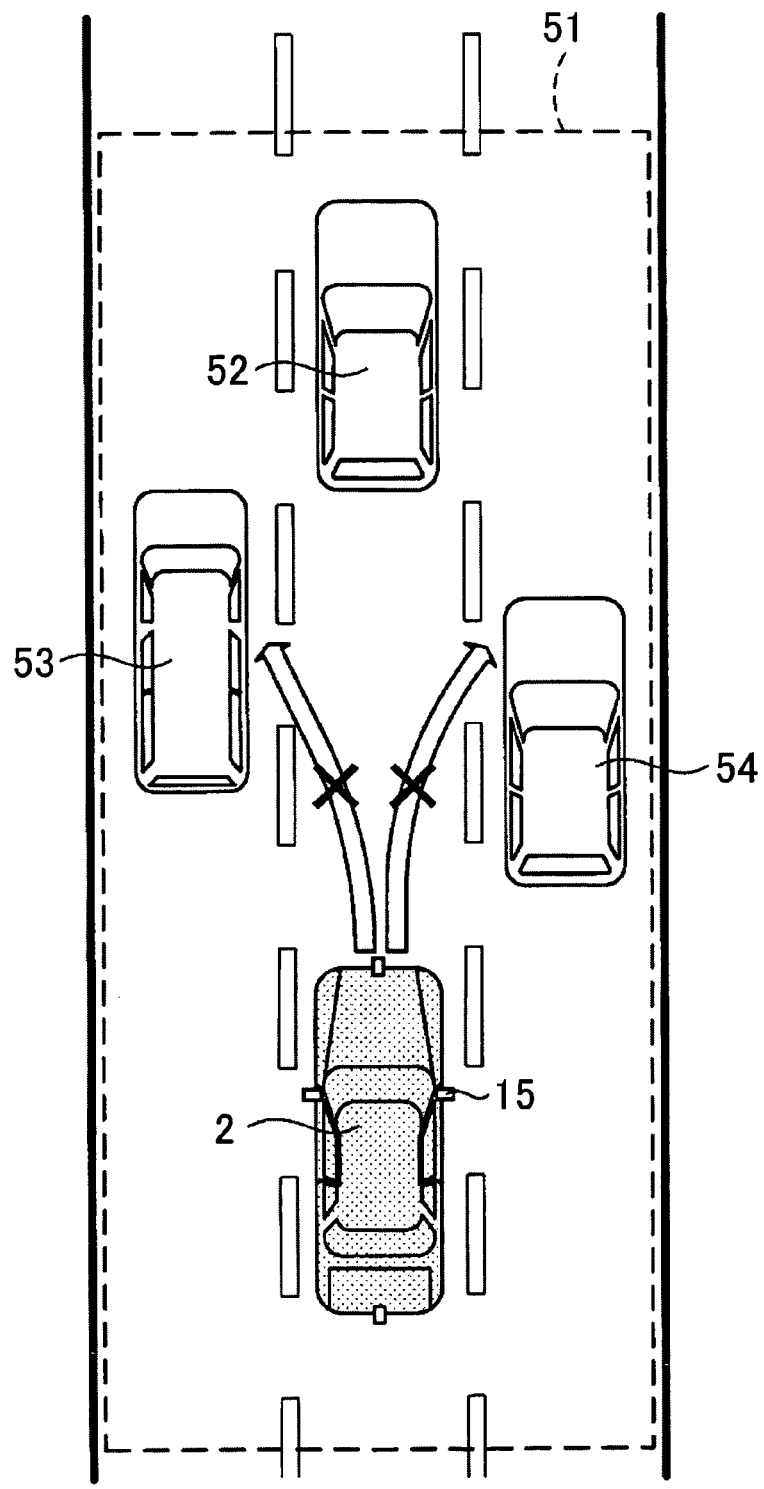
FIG. 10 illustrates another example of a traffic situation where it is determined that a collision with a preceding vehicle cannot be avoided through a steering operation.

Thus, if it is determined that there is an object at a distance closer than the preceding vehicle in all adjacent lanes (NO in S25), then routes for avoiding the preceding vehicle are blocked by those objects, making contact with the preceding vehicle unavoidable by steering. Therefore, it is determined that the braking control for deceleration, in order to mitigate an impact upon collision with the object, is appropriate as the type of control to be executed by the anti-collision control (S27). In the example illustrated in FIG. 10, there is a vehicle 53 in the left adjacent lane between the host vehicle 2 and the preceding vehicle 52, and there is a vehicle 54 in the right adjacent lane between the host vehicle 2 and the preceding vehicle 52. Thus, the vehicle 53 blocks the host vehicle 2 from a move to the left in order to avoid the preceding vehicle 52, and the vehicle 54 blocks the host vehicle 2 from a move to the right in order to avoid the preceding vehicle 52. In such cases, the braking control is selected as the type of control to be executed by the anti-collision control.

Figure 11:
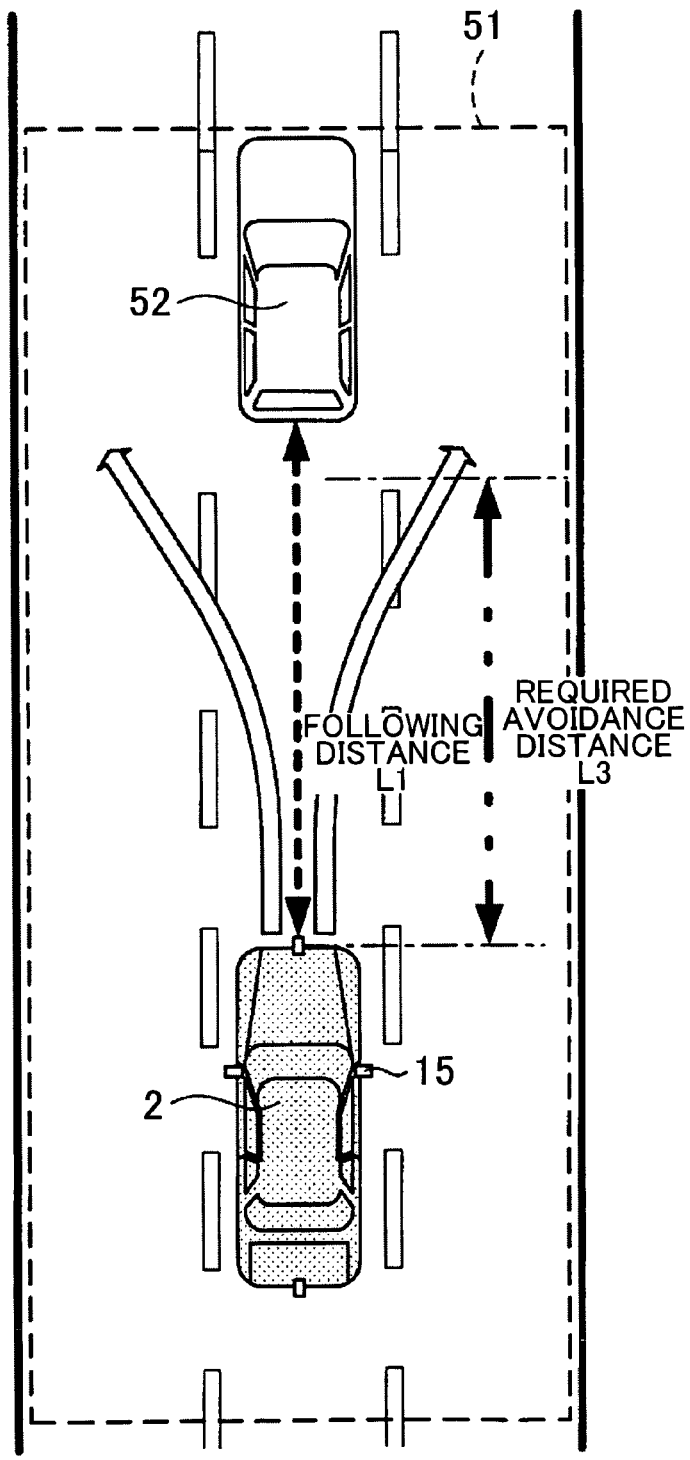
FIG. 11 illustrates an example of a traffic situation where it is determined that a collision with a preceding vehicle can be avoided through a steering operation.

On the other hand, if it is determined that no object exists at a distance closer than the preceding vehicle in at least one adjacent lane (YES in S25), then that adjacent lane represents a route for avoiding contact with the preceding vehicle through a steering operation. Therefore, it is determined that the avoidance control recommend an avoidance maneuver to the driver is appropriate as the type of control to be executed by the anti-collision control (S26). For example, in FIG. 11 there is no object between the host vehicle 2 and the preceding vehicle 52 in the right and left adjacent lanes, and the required avoidance distance L3 is shorter than the following distance L1. Thus, it is possible to avoid the preceding vehicle 52 through a steering operation. The programmed CPU 41 in executing S21 functions as the avoidance judgment unit 414.

Summarizing, when the host vehicle is approaching an object ahead, the following two methods here can be used in order to avoid contact with that object.

(1) Maintain a distance from the object without contacting the object by vehicle braking while maintaining the current direction of vehicle travel.

(2) Perform an avoidance maneuver by steering to change the travel direction of the host vehicle and moving the vehicle to the right or left of the object.

Comparing the above methods (1) and (2), in order to avoid contact with the object according to method (1), the driver must initiate a vehicle braking operation in order to avoid impact faster than the steering action required to avoid contact with the object according to method (2).

However, the vehicle cannot avoid an object ahead by moving into the right or left adjacent lane if conditions do not allow such an avoidance maneuver, such as when there is no adjacent lane next to the lane in which the vehicle is traveling, or if there is an adjacent lane next to the lane in which the vehicle is traveling, there is another object (e.g. a traveling vehicle) in that adjacent lane.

Hence, in the present invention, by using information regarding whether there is an open adjacent lane next to the lane in which the vehicle is traveling, the determinations in S24 and S25 are added so that it can be determined whether the vehicle is in a situation where contact with the object cannot be avoided by steering. As a consequence, the timing at which the braking control (S17) is initiated can be advanced, making it possible to reduce an impact upon contact with an object.

A sub-routine of the end determination subroutine of S7 will next be explained with reference to FIG. 6 which is a flowchart of the sub-routine.

In S31 the CPU 41 first determines whether the host vehicle is stopped using the vehicle speed sensor 29. If it is determined that the host vehicle is stopped (YES in S31), then there is no risk of the host vehicle subsequently contacting an object. Therefore, the anti-collision control is ended (S32).

On the other hand, if it is determined that the host vehicle is traveling (NO in S31), then it is further determined in S33 whether or not there is a preceding vehicle within the recognition range 51 of the millimeter wave radar 15. In particular, the CPU 41 determines whether the preceding vehicle information has been obtained in S12. Thus, if it is determined that there is no preceding vehicle within the recognition range 51 of the millimeter radar 15, that is, the preceding vehicle information is not obtained (YES in S33), then the risk of a collision between the host vehicle and a preceding vehicle is considered eliminated as a result of performing the anti-collision control, the anti-collision control is ended (S32) and the routine subsequently proceeds to S8.

On the other hand, if it is determined that there is a preceding vehicle within the recognition range 51 of the millimeter radar 15, that is, the preceding vehicle information is not obtained (NO in S33), then the risk of a collision between the host vehicle and a preceding vehicle has not been eliminated, and the anti-collision control is continued with the routine proceeding to S8.

As described in detail above, in application of the vehicle control device 1, the vehicle control method used by the vehicle control device 1, and the computer program executed by the vehicle control device 1 of the present invention, if a preceding vehicle is detected ahead of and traveling in the same direction as the vehicle (S1), then the following distance to the preceding vehicle is detected (S2), and the braking distance of the host vehicle is calculated (S3). If a risk of collision between the host vehicle and the preceding vehicle is determined, then the anti-collision control is executed (S6). In the anti-collision control, it is determined whether a collision with the preceding vehicle can be avoided through a steering operation by taking into consideration the host vehicle information, the preceding vehicle information, and the surrounding road conditions (S21 to S27). If avoidance is determined to be possible, then the shift-hold control is applied to the AT 5 (S16), whereas if avoidance is determined to be impossible, then the down-shift control is applied to the AT 5 (S17). Therefore, skidding can be suppressed during an avoidance maneuver by steering of the host vehicle 2. Accordingly, the preceding vehicle can be reliably avoided while the host vehicle 2 remains stable, thereby enabling safe driving.

Moreover, by comparing the braking distance calculated based on the vehicle speed of the host vehicle 2 and the distance to the preceding vehicle (S4), it is possible to accurately determine whether there is a risk of collision between the host vehicle and the preceding vehicle.

Taking into consideration the vehicle traveling in an adjacent lane also makes it possible to know whether or not an avoidance route exists in an adjacent lane whereby the host vehicle 2 can avoid the object (S25). Using the determination regarding whether an avoidance route can be secured enables a more accurate determination as to whether or not a collision between the host vehicle 2 and the preceding vehicle can be avoided through a steering operation.

Also, using information pertaining to adjacent lanes makes it possible to identify situations where contact with an object is unavoidable through steering, i.e., whether or not the vehicle is in a situation where contact with an object cannot be avoided regardless of any vehicle operation subsequently performed (S24, S25). As a consequence, the timing at which the braking control (S17) is initiated can be advanced, making it possible to reduce an impact upon contact with an object.

If no adjacent lane exists next to the lane in which the vehicle is traveling, then it is determined that a collision between an object and the vehicle is unavoidable by steering, and if there is an adjacent lane next to the lane in which the vehicle is traveling but there is another object in the adjacent lane, then too it is determined that a collision between the object and the vehicle is unavoidable. Therefore, a more accurate and prompt determination regarding whether contact with an object is avoidable through steering can be performed than in the past.

The foregoing describes, in particular, an embodiment in which a preceding vehicle ahead of in the direction of travel of the vehicle is the object (obstacle) detected. However, the object may be something other than a preceding vehicle. The object may instead be a person, a bicycle, a guardrail, or the like.

Furthermore, in the embodiment described above, the navigation ECU 23 provided in the navigation device 3 executes the vehicle control processing program shown in FIGS. 3 to 6. However, the vehicle control processing program may be executed instead by the engine ECU 7, the AT ECU 8, the brake ECU 9, or the like. Processing may also be divided between and performed by a plurality of ECUs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle control device comprising:
   a vehicle speed obtaining unit that obtains a vehicle speed of a host vehicle;
   an object distance obtaining unit that obtains a distance to an object ahead of the host vehicle;
   a collision judgment unit that determines whether or not there is a risk of a collision between the object and the host vehicle, based on the obtained vehicle speed and the obtained distance to the object;
   a vehicle speed judgment unit that, responsive to a determination by the collision judgment unit that there is a risk of a collision between the object and the host vehicle, determines whether or not the obtained vehicle speed is less than a turnable speed, the turnable speed being a speed at which the host vehicle can safely turn;
   an avoidance judgment unit that, responsive to a determination by the vehicle speed judgment unit that the obtained vehicle speed is less than the turnable speed, determines whether the collision between the object and the host vehicle can be avoided through a steering operation based on whether or not there is an adjacent lane next to a lane in which the host vehicle is traveling; and
   a braking control unit that executes braking control to decelerate the host vehicle responsive to a determination by the vehicle speed judgment unit that the obtained vehicle speed is equal to or greater than the turnable speed, or responsive to a determination by the avoidance judgment unit that a collision between the object and the host vehicle cannot be avoided by a steering operation.

2. The vehicle control device according to claim 1, wherein the avoidance judgment unit:
   determines that a collision between the object and the host vehicle is unavoidable if there is no adjacent lane next to the lane in which the host vehicle is traveling, and
   determines that a collision between the object and the host vehicle is unavoidable by the steering operation if there is an adjacent lane next to the lane in which the host vehicle is traveling but there is another object in the adjacent lane.

3. A vehicle control method comprising the steps of:
   obtaining a vehicle speed of a host vehicle;
   obtaining a distance to an object ahead of the host vehicle;
   determining whether there is a risk of a collision between the object and the host vehicle based on the host vehicle speed and the distance to the object;
   responsive to a determination that there is a risk of a collision between the object and the host vehicle, determining whether or not the obtained vehicle speed is less than a turnable speed at which the host vehicle can safely turn;
   responsive to a determination that the obtained vehicle speed is less than the turnable speed, determining whether the collision between the object and the host vehicle can be avoided through a steering operation based on whether there is an adjacent lane next to a lane in which the host vehicle is traveling; and
   controlling braking to decelerate the host vehicle responsive to a determination by the vehicle speed judgment unit that the obtained vehicle speed is equal to or greater than the turnable speed, or responsive to a determination that a collision between the object and the host vehicle cannot be avoided by a steering operation.

4. A non-transitory computer-readable medium encoded with a program for causing a computer to execute:
   a vehicle speed obtaining function that obtains a vehicle speed of a host vehicle;
   an object distance obtaining function that obtains a distance to an object ahead of the host vehicle;
   a collision judgment function that determines whether or not there is a risk of a collision between the object and the host vehicle based on the obtained vehicle speed and the obtained distance to the object;
   a vehicle speed judgment function that, responsive to a determination by the collision judgment unit that there is a risk of a collision between the object and the host vehicle, determines whether or not the obtained vehicle speed is less than a turnable speed, the turnable speed being a speed at which the host vehicle can safely turn;
   an avoidance judgment function that, responsive to a determination by the vehicle speed judgment function that the obtained speed is less than the turnable speed, determines whether or not the collision between the object and the host vehicle can be avoided through a steering operation based on whether there is an adjacent lane next to a lane in which the host vehicle is traveling; and
   a braking control function that controls braking to decelerate the host vehicle responsive to a determination by the vehicle speed judgment unit that the obtained vehicle speed is equal to or greater than the turnable speed, or responsive to a determination that a collision between the object and the host vehicle cannot be avoided by a steering operation.

5. A vehicle control device according to claim 1 wherein the braking control unit, responsive to a judgment that collision between the object and the host vehicle cannot be avoided by a steering operation, executes a down-shift control to cause a down-shift, and, responsive to a judgment that collision between the object and the host vehicle can be avoided by a steering operation, executes a shift-hold control.

6. A vehicle control device according to claim 1 wherein the object is another vehicle.

7. A vehicle control method according to claim 3 wherein braking is by down-shifting, responsive to a judgment that collision between the object and host vehicle cannot be avoided by a steering operation, and wherein, responsive to a judgment that collision between the object and the host vehicle can be avoided by a steering operation, shift-holding control is executed.

8. A vehicle control method according to claim 3 wherein the object is another vehicle.

9. A non-transitory computer-readable medium according to claim 4 wherein the braking control function, responsive to a judgment that collision between the object and the host vehicle cannot be avoided by a steering operation, executes a down-shift control to cause a down-shift, and, responsive to a judgment that collision between the object and the host vehicle can be avoided by a steering operation, executes a shift-hold control.

10. A non-transitory computer-readable medium according to claim 4 wherein the object is another vehicle.

* * * * *